United States Patent [19]

Hazan

[11] 4,222,837
[45] Sep. 16, 1980

[54] ELECTRODEPOSITION PROCESS WITH ULTRAFILTRATION

[75] Inventor: Isidor Hazan, Clementon, N.J.

[73] Assignee: E. I. du Pont de Nemours and Company, Wilmington, Del.

[21] Appl. No.: 56,216

[22] Filed: Jul. 10, 1979

[51] Int. Cl.$^2$ .................... C25D 13/06; C25D 13/10; C25D 13/20
[52] U.S. Cl. .................................................. 204/181 C
[58] Field of Search .................................... 204/181 C

[56] References Cited

U.S. PATENT DOCUMENTS

| | | | |
|---|---|---|---|
| 3,663,404 | 5/1972 | Loop | 204/181 C |
| 3,954,588 | 5/1976 | Hazan et al. | 204/181 C |
| 4,036,721 | 7/1977 | Kato et al. | 204/181 C |

Primary Examiner—Howard S. Williams

[57] ABSTRACT

In a cationic electrocoating process in which phosphoric acid is used as an acidic ionizing agent for the polymer in the coating composition, and in which excess phosphoric acid build-up in the bath is removed by ultrafiltration, phosphoric acid in the filtrate can be reacted with certain metals to make dissolved dihydrogen metal phosphate salt so that the filtrate can be returned to the electrocoating bath. In the bath, part of the dihydrogen metal phosphate salt is consumed by its deposition on the substrate as an insoluble metal phosphate salt.

6 Claims, No Drawings

ELECTRODEPOSITION PROCESS WITH ULTRAFILTRATION

BACKGROUND OF THE INVENTION

This invention relates to an electrodeposition process using ultrafiltration in which at least a part of the filtrate is returned to the bath.

U.S. Pat. Nos. 4,136,070 - Hazan (Jan. 23, 1979) and 4,115,227 - Hazan (Sept. 19, 1978), respectively, are directed to coating compositions and aqueous processes for cationic electrodeposition of paints. Typically, a layer of zinc phosphate forms directly on the substrate, followed by a layer of a polymer which is adequately hydrophobic to provide a high-solids content in the initially formed coating. Phosphoric acid is used as an acidic ionizing agent in the bath, and dissolved dihydrogen phosphate salts of metals such as zinc, iron, calcium, magnesium and aluminum are present in the bath and are precipitated by a boundary layer pH change on the substrate as insoluble phosphate salts with either one hydrogen or no hydrogens in the salt.

Several U.S. patents describe ultrafiltration processes particularly adapted for use with electrodeposition. For instance, U.S. Pat. No. 3,663,401 - Christenson et al. (1972) uses ultrafiltration to remove water-soluble acids from an anionic electrodeposition bath. U.S. Pat. Nos. 3,663,404 - Loop (1972) and 3,663,397 - Bras et al. (1972) return directly to the electrodeposition bath at least a portion of the concentrate or retentate and use at least a portion of the filtrate as a rinse for the coated substrate, either remote from the bath or over the bath. Also, informative in this technology are U.S. Pat. Nos. 3,663,400 - Christenson et al. (1972) and 3,663,405 - Christenson et al. (1972).

All of the above-mentioned patents are incorporated herein by reference.

Ultrafiltration is desirable in cationic electrodeposition to control the level of acid and other water-soluble materials in the electrodeposition bath. The filtrate can be disposed of or reused. As an alternative, flushed anode technology can be used for the separation and disposal of acid generated during the operation of a cathodic system by disposal of the anolyte in which the acid is relatively concentrated. Ultrafiltration is useful in initially conditioning an electrocoating bath and in isolating problems. For instance, if too much water is put into the bath along with some of the ingredients, it can be removed by sending the filtrate to a drain. In loading a fresh bath, it is often desirable to send the filtrate of an ultrafilter to drain for one or two turnovers of the bath, to assure optimum operating conditions. Even after a bath has been optimized, excess build-up of acid in cationic bath must be avoided.

It is desirable to be able to operate the process of the two Hazan patents mentioned above, using ultrafiltration, without the need for flushed anodes, while still conserving the phosphoric acid values in the system, thus eliminating or minimizing the need for disposal of filtrate or anolyte and minimizing cost and pollutants.

SUMMARY OF THE INVENTION

The present invention provides a process for electrocoating with a coating composition a negatively-charged substrate immersed in a coating bath containing an aqueous dispersion of said coating composition, wherein said coating composition comprises a cationic film-forming polymer containing basic groups, phosphoric acid as an acidic ionizing agent, and dissolved dihydrogen phosphate salts of one or more metals selected from the group of zinc, iron, calcium, magnesium and aluminum, said process producing directly on the substrate a first coating of phosphate salt of the selected metal and on said first coating a second coating of said film-forming polymer, said process comprising subjecting at least a portion of the bath to an ultrafiltration process wherein an ultrafiltration membrane retains the polymer and passes a filtrate including water and phosphoric acid, returning the retentate from the ultrafiltration process to the bath and subsequently using at least part of the filtrate to rinse coated substrate, and returning at least part of the rinse to the electrocoating bath, the improvement which comprises immersing in the filtrate, separate from the bath and prior to the use of the filtrate in rinsing the coated substrate, a quantity of said selected metal, in the form of either metal or oxide, and permitting reaction of said metal with phosphoric acid to produce dissolved dihydrogen metal phosphate salts in the filtrate.

Preferably, the selected metal is zinc, provided either as metal or as zinc oxide. Iron is also particularly desirable as the selected metal.

While the immersing of the selected metal in the filtrate can be done in a pipeline, practical considerations such as holding time make it more desirable to do the immersing in a holding tank for the filtrate.

DETAILED DESCRIPTION OF THE INVENTION

U.S. Pat. No. 4,115,227 - Hazan describes from column 4, line 54, through column 5, line 31, the conversion of soluble diacid phosphoric salts to insoluble salts which deposit on the substrate being coated. It also describes in column 6, lines 27–37, and in claim 11 the use of zinc, ZnO or $Zn(OH)_2$ to prevent excess phosphoric acid build-up in the bath.

However, it has been discovered that the direct addition of these or other metals to the electrodeposition bath for the purpose of consuming excess phosphoric acid can lead to unwanted defects in the deposited paint film. In the present invention, it has been discovered to be preferable to add certain metals to the filtrate of an ultrafiltration system, preferably in a separate holding tank. The filtrate is then used to rinse coated substrate, with at least part of the rinse beng recirculated to the electrodeposition bath. If the selected metal were provided as the hydroxide, the hydroxide itself would be soluble in water even without reacting with excess phosphoric acid. This could result in the undesirable transport of, for instance, $Zn(OH)_2$ from the holding tank to the electrodeposition bath with unwanted effects on the coatings. Any hydroxide forming incidentally on the surface of metal or oxide will react promptly with the excess phosporic acid. In cases where hydroxide formation might be a problem, it can be avoided by selection of amounts and form of the metal or oxide.

Thus, the present invention provides the selected metal, either as a metal or the oxide, immersed in the filtrate separate from the electrodeposition bath.

In a preferred embodiment, the coating composition of U.S. Pat. No. 4,136,070 - Hazan is used for electrodeposition in a bath which is circulated through an ultrafiltration apparatus such as that of U.S. Pat. No. 3,663,404 - Loop. The circulation rate is preferably about six bath volumes per hour. For each 30 volumes of bath content circulated through the ultrafiltration apparatus, about 5 volumes of filtrate are removed and taken to a holding tank in which is immersed a bar of zinc metal. So long as some of the zinc metal remains undissolved, it performs its function of reacting with the excess phosphoric acid to form dissolved zinc dihydrogen phosphate. The treated filtrate is then used to rinse coated substrate either separately from the electrodeposition bath, or over the electrodeposition bath, or both. At least part of the filtrate used for rinsing is subsequently fed back to the electrodeposition bath, where part of the water-soluble zinc dihydrogen phosphate is consumed by its deposition on the substrate as an insoluble zinc phosphate salt.

Instead of a bar of the selected metal, pellets of the metal or oxide can be used, preferably suspended in the holding tank in a metal cage or an acid-resistant cloth bag.

I claim:

1. In a process for electrocoating with a coating composition a negatively charged substrate immersed in a coating bath containing an aqueous dispersion of said coating composition, wherein said coating composition comprises a cationic film-forming polymer containing basic groups, phosphoric acid as an acidic ionizing agent, and dissolved dihydrogen phosphate salts of one or more metals selected from the group of zinc, iron, calcium, magnesium and aluminum, said process producing directly on the substrate a first coating of phosphate salt of the selected metal and on said first coating a second coating of said film-forming polymer, said process comprising subjecting at least a portion of the bath to an ultrafiltration process wherein an ultrafiltration membrane retains the polymer and passes a filtrate including water and phosphoric acid, returning the retentate from the ultrafiltration process to the bath, and subsequently using at least part of the filtrate to rinse coated substrate and returning at least part of the rinse to the electrocoating bath, the improvement which comprises immersing in the filtrate, separate from the bath and prior to the use of the filtrate in rinsing the coated substrate, a quantity of said selected metal, in the form of either metal or oxide, and permitting reaction of said metal with phosphoric acid to produce dissolved dihydrogen metal phosphate salts in the filtrate.

2. The process of claim 1 wherein the selected metal includes zinc.

3. The process of claim 1 wherein the selected metal includes zinc in the form of zinc oxide.

4. The process of claim 1 wherein the selected metal includes iron.

5. The process of claim 1 wherein the immersing is done in a holding tank for the filtrate.

6. The process of claim 1 wherein the immersing is done in a pipeline through which the filtrate passes prior to its use in rinsing.

* * * * *